C. E. COE.
FAUCET.
APPLICATION FILED SEPT. 6, 1905.
900,984.
Patented Oct. 13, 1908.
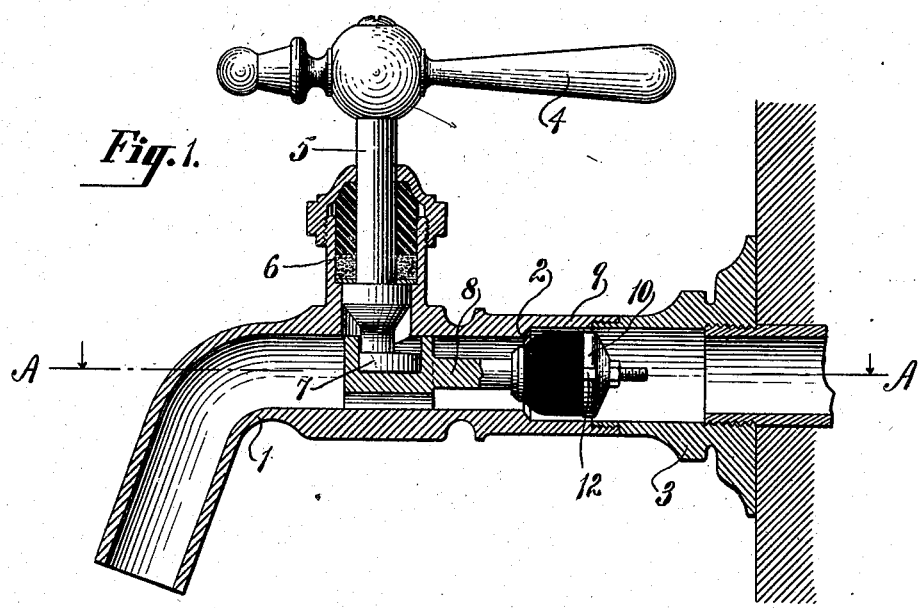
Fig. 1.
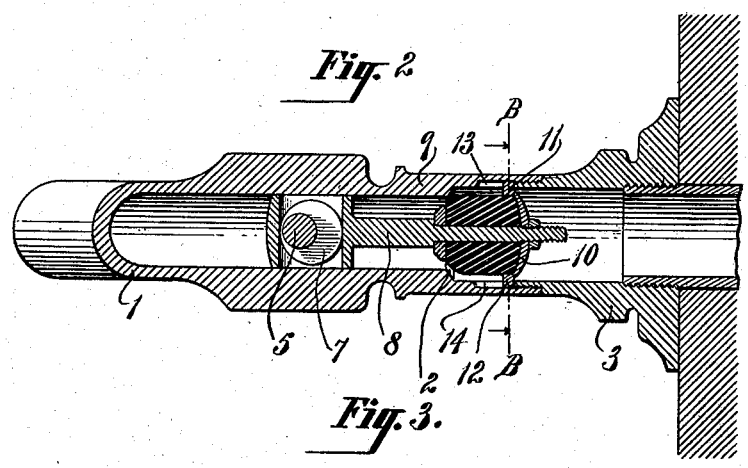
Fig. 2.
Fig. 3.
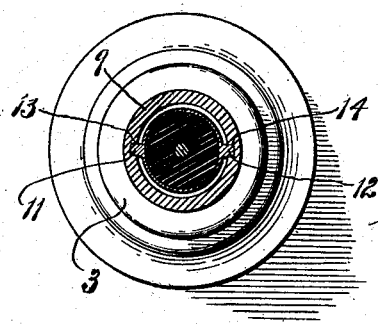
Witnesses:
F. D. Wachenburg
Henry Thieme
Inventor:
Clinton E. Coe
by attorneys

UNITED STATES PATENT OFFICE.

CLINTON E. COE, OF NEW HAVEN, CONNECTICUT.

FAUCET.

No. 900,984.   Specification of Letters Patent.   Patented Oct. 13, 1908.

Application filed September 6, 1905. Serial No. 277,150.

*To all whom it may concern:*

Be it known that I, CLINTON E. COE, a citizen of the United States, and resident of New Haven, in the county of New Haven and State of Connecticut, have invented a new and useful Improvement in Faucets, of which the following is a specification.

This invention relates to an improvement in that class of faucets known to the trade as "Fuller faucets".

The object of my invention is to provide a faucet in which the noise and rattle resulting from the hammering of the valve when open, is obviated without impeding to any great extent the free flow of water past the valve.

A further object is to provide novel means for guiding the valve in its longitudinal movements and at the same time holding the valve in a very simple manner against rotary movement whereby the friction between the valve stem and the spindle eccentric is reduced, thus insuring a more easily operated valve.

A practical embodiment of my invention is represented in the accompanying drawings in which Figure 1 represents the faucet in longitudinal central section, Fig. 2 is a horizontal section taken in the plane of the line A—A of Fig. 1, looking in the direction of the arrows, and Fig. 3 is a transverse section taken in the plane of the line B—B of Fig. 2, looking in the direction of the arrows.

The body of the faucet is denoted by 1 and it is provided near its inner end with an annular valve seat 2. This faucet body 1 has a screw-threaded engagement with the pipe fitting 3, the pipe fitting in the present instance having an exterior screw-thread and the inner end of the faucet body having an interior screw-thread.

The handle of the faucet is denoted by 4 and its spindle 5 which passes through the packing box 6 into the interior of the faucet body 1, is provided with an eccentric 7 which is arranged to engage the stem 8 of the valve 9 for the purpose of moving the valve toward and away from its seat 2. This valve 9 is supported by the faucet body and is also guided in its movements toward and away from its seat by providing the shell 10 of the valve with oppositely arranged lugs 11 and 12 projecting from the sides of the said shell, which lugs are fitted to slide in longitudinal grooves 13 and 14 in the bore of the faucet body adjacent to its inner end. The forward part of the valve stem 8 is supported within the faucet body as usual. In the construction as herein set forth it will be seen that the use of spiders on the valve stem or in the faucet body or pipe fitting is obviated, the valve at the same time being not only supported in concentric relation to its seat but also being guided toward and away from its seat without unduly closing the space around the valve.

It will furthermore be seen that the construction as herein described is very simple and is such that the valve and its stem may be readily removed from the faucet body when the eccentric has been withdrawn from its engagement with the valve stem and the faucet body has been unscrewed from the pipe fitting, the longitudinal grooves which form part of the tongue-and-groove connection between the valve and the faucet body being open at their rear ends when the faucet is removed from the pipe fitting.

Furthermore, by providing the lugs on the shell, I am enabled to materially simplify the valve construction.

What I claim as my invention is:

A faucet body having an annular valve seat near its inner end, a handle having its spindle provided with an eccentric, a valve fitted to slide longitudinally in the body portion of the faucet, said valve comprising a head, a stem proper, and an enlarged portion at the end of the stem proper fitted to engage and be guided in its movement by the interior walls of the body portion of the faucet, said enlarged portion being also arranged for engagement with the eccentric, by the movement of which the valve is moved toward or away from its seat, a valve shell at the outer end of the valve, oppositely arranged lugs projecting from the shell and longitudinal grooves in the bore of the faucet body, said grooves being open through the inner end of the faucet body for facilitating the insertion and removal of the valve.

In testimony, that I claim the foregoing as my invention, I have signed my name in presence of two witnesses, this 1st day of September, 1905.

CLINTON E. COE.

Witnesses:
  KATH. M. WESTERMAN,
  FREDERICK L. PERRY.